United States Patent [19]

Sumiya

[11] Patent Number: 4,476,887

[45] Date of Patent: Oct. 16, 1984

[54] HYDRAULIC GOVERNOR PRESSURE GENERATOR

[75] Inventor: Koji Sumiya, Nishio, Japan

[73] Assignee: Aisin Warner Kabushiki Kaisha, Aichi, Japan

[21] Appl. No.: 348,310

[22] Filed: Feb. 12, 1982

[51] Int. Cl.$^3$ ............................................. G05D 13/08
[52] U.S. Cl. ..................................... 137/56; 137/544; 137/546; 210/171; 210/222
[58] Field of Search .................... 137/54, 56, 544, 546; 210/222, 168, 171; 184/6.25; 335/305

[56] References Cited

U.S. PATENT DOCUMENTS 4,194,518  3/1980  Iwanaga ........................... 137/54 X

FOREIGN PATENT DOCUMENTS 562887  9/1958  Canada ............................... 210/222

Primary Examiner—Robert G. Nilson
Attorney, Agent, or Firm—Koda and Androlia

[57] ABSTRACT

A hydraulic governor pressure generator including a governor body fixedly mounted on a rotational shaft, a governor valve movably mounted in a cavity of the governor body in the radial direction with respect to the rotational shaft according to centrifugal force acting thereon, an input oil passage and an output oil passage provided in the governor body communicating with each other through a clearance between the inner peripheral wall surface of the governor body and the outer peripheral wall surface of the governor valve and at least one pocket provided in each one of the input and output oil passage and recessed in a direction away from the rotational center of the rotational shaft to collect therein particles of swarf of foreign material in the working oil in the input and output passages.

2 Claims, 4 Drawing Figures

HYDRAULIC GOVERNOR PRESSURE GENERATOR

BACKGROUND OF THE INVENTION

This invention relates generally to a hydraulic governor pressure generator and more particularly to a hydraulic governor pressure generator for a hydraulic control circuit of an automatic transmission of the motor vehicle for supplying an output oil pressure (hereinafter referred to as "governor pressure" for brevity) commensurate with the vehicle speed.

The vehicular automatic transmission which generally comprises a torgue converter, a transmission gear system and a hydraulic control system has a possibility of suffering from an operational trouble when particles of swarf such as iron particles or other particles of foreign material are entrained in the operating oil, for example, malfunctioning of the hydraulic components through which the operating fluid is circulated or the so-called "sticking phenomenon" of hydraulic valves.

In this regard, the conventional practice has been to provide an oil strainer in the automatic transmission. However, as a matter of fact it has been found difficult to remove very fine particles of swarf and foreign material by the oil strainer alone.

SUMMARY OF THE INVENTION

It is therefore an object of the present invention to solve the above-mentioned problem. Another and more particular object of the present invention is to provide a hydraulic governor pressure generator which is adapted to collect in a predetermined place magnetic particles of swarf and foreign substance in the operating oil by means of centrifugal force and/or a magnet, thereby to clean the operating oil.

According to the present invention, there is provided a hydraulic governor pressure generator including a governor body fixedly mounted on a rotational shaft, a governor valve movably mounted in a cavity of the governor body in the radial direction with respect to the rotational shaft according to centrifugal force acting thereon, an input oil passage and an output oil passage provided in the governor body communicating with each other through a clearance between the inner peripheral wall surface of the governor body and the outer peripheral wall surface of the governor valve, the hydraulic governor pressure generator comprising: at least one pocket provided in each one of the input and output oil passages and recessed in a direction away from the rotational center of the rotational shaft to collect therein particles of swarf or foreign material in the working oil in the input and output passages.

The above and other objects, features and advantages of the present invention will become apparent from the following description and appended claims, taken in conjunction with the accompanying drawings which show by way of example a preferred embodiment of the invention.

DESCRIPTION OF PREFERRED EMBODIMENT

Figure 1:
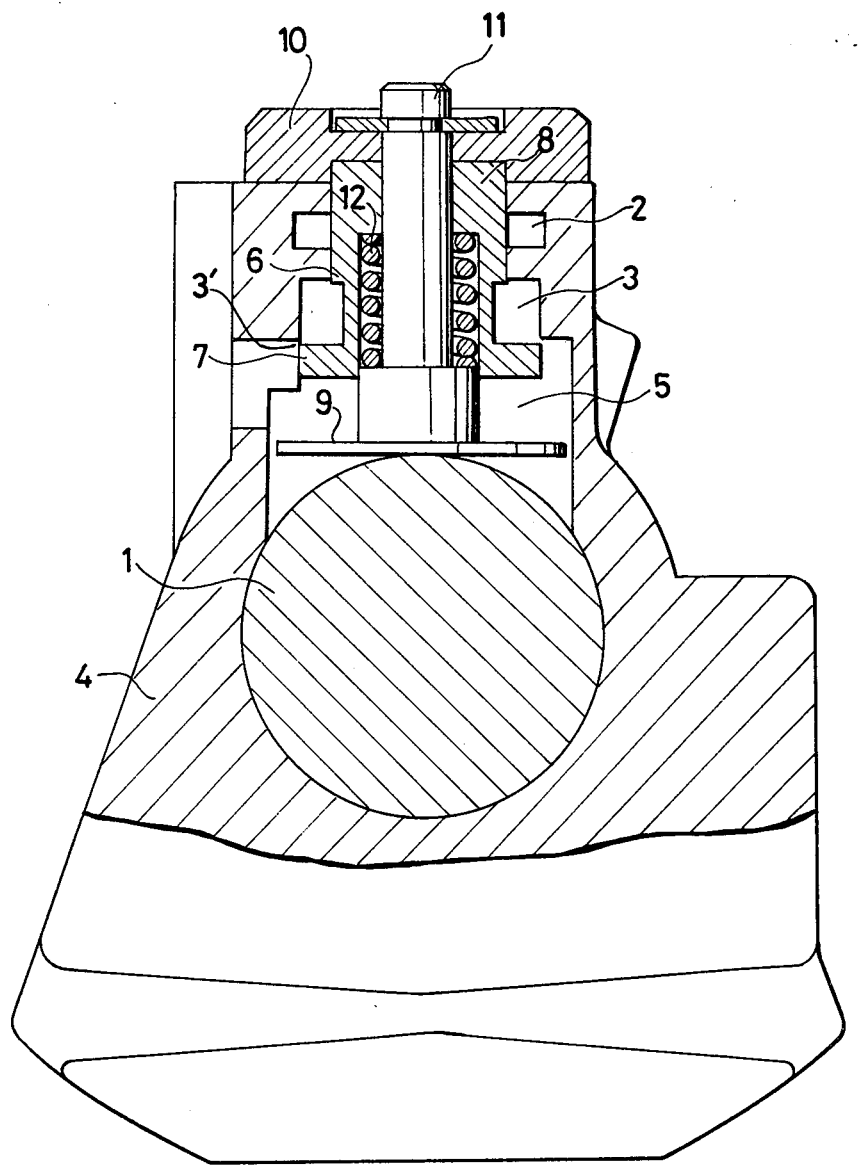
FIG. 1 is a vertical section of a hydraulic governor pressure generator according to the present invention.

Referring to FIG. 1, there is shown a hydraulic governor pressure generator according to the present invention, including a governor body 4 which is securely mounted on a rotational output shaft 1 of an automatic transmission and interiorly formed with an input oil chamber 2 and an output oil chamber 3 contiguously with a cylindrical cavity 5. Fittingly received in the cavity 5 is a cylindrical valve body 8 which is provided with a stepped portion 6 and, at the inner end on the side of the rotational shaft 1, with a land 7. Slidably fitted through an axial bore of the valve body 8 is a shaft member 11 which is provided with a disc 9 at its inner end on the side of the rotational shaft 1 and has a governor weight 10 securely fixed at its outer end. A spring 12 is interposed between the shaft 11 and the valve body 8.

In this governor pressure generator, the input oil chamber 2 and output oil chamber 3 are communicated with each other through the clearance which is formed between the outer periphery of the valve body 8 and an inner peripheral wall portion of the governor body 4 between the input and output oil chambers. The governor pressure is adjusted by controlling the flow rate of oil through the clearance and the open area of drain port 3' by the movement of the valve body 8 which is under the influence of the centrifugal force and the oil pressure acting on the land 7.

Figure 2:
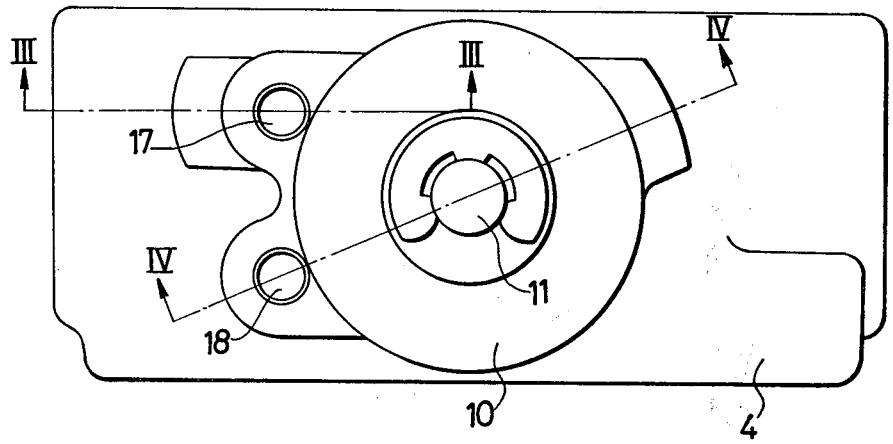
FIG. 2 is a plan view of the same governor pressure generator.
Figure 3:
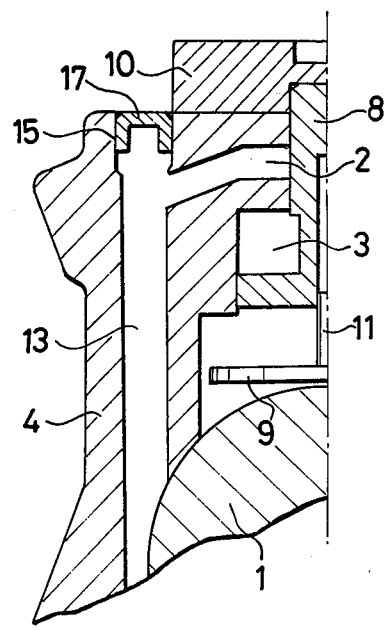
FIG. 3 is a section taken on line III—III of FIG. 2.
Figure 4:
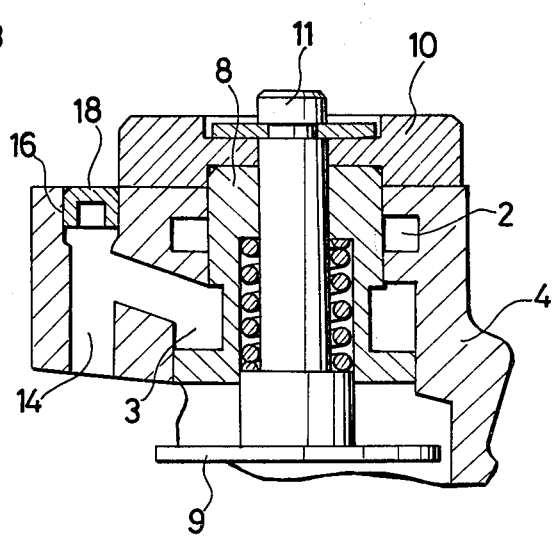
FIG. 4 is a section taken on line IV—IV of FIG. 2.

FIG. 2 shows the governor pressure generator as viewed from above in FIG. 1, while FIGS. 3 and 4 show the same governor pressure generator in sections taken on lines III—III and IV—IV of FIG. 2, respectively. In these figures, similar component parts are designated by similar reference numerals.

In FIG. 3, denoted at 13 is an input oil passage which is in communication with the input oil chamber 2, and, in FIG. 4, designated at 14 is an output oil passage which is in communication with the output oil chamber 3. The input and output oil passages 13 and 14 are provided with pockets 15 and 16, respectively, which are recessed in a direction away from the rotational center of the governor pressure generator. The pockets 16 and 17 are formed in a larger diameter than the oil passages 13 and 14 for securely retaining therein magnets 17 and 18, respectively. The magnets 17 and 18 have cup-like shape in the particular embodiment shown, but there may be employed magnets of other shapes if desired.

The line pressure which is generated within a hydraulic control system (not shown) of an automatic transmission is supplied to the input oil chamber 2 through the input oil passage 13 to generate a governor pressure in the output oil chamber 3 in the manner as described above, and the thus generated governor pressure is supplied to the hydraulic control system through the output oil passage 14.

With the above-described construction, the particles of swarf and foreign material which are contained in the operating oil in the input and output oil passages 13 and 14 are thrown radially outward under the influence of the centrifugal force and collected in the pockets 5 and 16. Since cup-like magnets 17 and 18 are fitted in the pockets 15 and 16, particles of magnetic material (e.g., iron powder) are retained in the respective recesses by magnetic attraction without being entrained again in the operating oil even when the rotation is stopped.

It will be appreciated from the foregoing description that the present invention is very effective for removing the particles of swarf and foreign material which are contained in the operating oil, including even the fine particles which are difficult to remove by an oil strainer, by utilization of centrifugal and/or magnetic forces, constantly ensuring normal functioning of the respective hydraulic components of the automatic transmission including the governor pressure generator.

What is claimed is:

1. A hydraulic governor pressure generator including a governor body fixedly mounted on a rotational shaft, a governor valve movably mounted in a cavity of the governor body in the radial direction with respect to the rotational shaft according to centrifugal force acting thereon, an input oil passage and an output oil passage provided in the valve body communicating with each other through a clearance between the inner peripheral wall surface of said governor body and the outer peripheral wall surface of said governor valve, said hydraulic governor pressure generator comprising:

at least one pocket provided in each one of said input and output oil passages and recessed in a direction away from the rotational center of said rotational shaft, the diameter thereof being larger than that of said input or output oil passage, one end thereof being opened in a surface of said governor body, and a magnet fixed in each one of said pockets so as to close said one end thereof, whereby particles of swarf or foreign material in the working oil in said input and output passages are collected in said pockets by means of magnetic forces as well as centrifugal force.

2. A hydraulic governor pressure generator as set forth in claim 1, wherein each one of said magnet has a cup-like shape.

* * * * *